(12) United States Patent
Martino

(10) Patent No.: US 11,670,148 B2
(45) Date of Patent: *Jun. 6, 2023

(54) PILF RESISTANT PACKAGING SYSTEM

(71) Applicant: Marc G. Martino, Westlake Village, CA (US)

(72) Inventor: Marc G. Martino, Westlake Village, CA (US)

(*) Notice: Subject to any disclaimer, the term of this patent is extended or adjusted under 35 U.S.C. 154(b) by 192 days.

This patent is subject to a terminal disclaimer.

(21) Appl. No.: 17/156,668

(22) Filed: Jan. 25, 2021

(65) Prior Publication Data

US 2021/0142637 A1 May 13, 2021

Related U.S. Application Data

(63) Continuation of application No. 16/120,425, filed on Sep. 3, 2018, now Pat. No. 10,902,709, which is a
(Continued)

(51) Int. Cl.
*G08B 13/20* (2006.01)
*B65D 73/00* (2006.01)
(Continued)

(52) U.S. Cl.
CPC ......... *G08B 13/20* (2013.01); *B65D 73/0007* (2013.01); *B65D 81/2007* (2013.01);
(Continued)

(58) Field of Classification Search
CPC ............... G08B 13/20; B65D 73/0007; B65D 81/2007; B65D 13/2448; B65D 2203/10;
(Continued)

(56) References Cited

U.S. PATENT DOCUMENTS

| | | | |
|---|---|---|---|
| 6,262,664 B1 * | 7/2001 | Maloney | G08B 13/2431 340/568.2 |
| 7,659,816 B2 * | 2/2010 | Wandel | B65D 55/026 340/572.8 |

(Continued)

*Primary Examiner* — Jack K Wang
(74) *Attorney, Agent, or Firm* — Orbit IP

(57) ABSTRACT

A theft-proof packaging system includes a product package including a compartment configured to encapsulate a product. The compartment is in a non-surrounding environmental state, the non-surrounding environmental state being either pneumatically pressurized above a surrounding environment or pneumatically vacuumized below the surrounding environment. A pressure sensor inside the compartment includes a switch, the switch configured to disconnect and connect a power source to a transmitter, wherein the switch is configured to disconnect the power source from the transmitter in the presence of the non-surrounding environmental state inside the compartment and the switch is configured to connect the power source to the transmitter when the compartment equalizes to the surrounding environment. A receiving unit is disposed remote from the product package and receives the signal from the transmitter and sounds an alarm. A passive RFID tag may be located within the compartment and detected when passing through a walk-through scanner.

16 Claims, 3 Drawing Sheets

Related U.S. Application Data continuation-in-part of application No. 14/961,461, filed on Dec. 7, 2015, now Pat. No. 10,066,388, which is a continuation-in-part of application No. 14/214,817, filed on Mar. 15, 2014, now Pat. No. 9,227,764.

(60) Provisional application No. 61/786,597, filed on Mar. 15, 2013.

(51) Int. Cl.
| | | |
|---|---|---|
| *B65D 81/20* | (2006.01) | |
| *G08B 13/24* | (2006.01) | |
| *G01M 3/32* | (2006.01) | |
| *E04B 2/46* | (2006.01) | |
| *E04B 2/72* | (2006.01) | |
| *E04B 2/74* | (2006.01) | |
| *E04F 13/24* | (2006.01) | |
| *E04B 2/02* | (2006.01) | |
| *E04F 13/08* | (2006.01) | |

(52) U.S. Cl.
CPC ...... *G08B 13/2448* (2013.01); *B65D 2203/10* (2013.01); *B65D 2211/00* (2013.01); *E04B 2/46* (2013.01); *E04B 2/721* (2013.01); *E04B 2/7457* (2013.01); *E04B 2002/0202* (2013.01); *E04B 2002/7466* (2013.01); *E04B 2002/7483* (2013.01); *E04B 2002/7487* (2013.01); *E04F 13/083* (2013.01); *E04F 13/24* (2013.01); *G01M 3/3272* (2013.01)

(58) Field of Classification Search
CPC ....... B65D 3322/00; E04B 2/46; E04B 2/721; E04B 2/7457; E04B 2002/0202; E04B 2002/7483; E04B 2002/7487

See application file for complete search history.

(56) References Cited

U.S. PATENT DOCUMENTS

| | | | | |
|---|---|---|---|---|
| 7,671,741 | B2 * | 3/2010 | Lax | E05B 73/0017 |
| | | | | 235/385 |
| 2005/0244552 | A1 * | 11/2005 | Roth | B65B 31/028 |
| | | | | 426/129 |
| 2008/0136619 | A1 * | 6/2008 | Moran | H04Q 9/00 |
| | | | | 340/505 |
| 2010/0060456 | A1 * | 3/2010 | Forster | G06K 19/0707 |
| | | | | 340/572.1 |
| 2013/0033364 | A1 * | 2/2013 | Raz | G06K 19/07345 |
| | | | | 235/492 |
| 2013/0036802 | A1 * | 2/2013 | Johnson | A61F 13/42 |
| | | | | 73/74 |

* cited by examiner

PILF RESISTANT PACKAGING SYSTEM

CROSS-REFERENCE TO RELATED APPLICATIONS

This continuation application claims priority to the continuation-in-part application Ser. No. 16/120,425 filed on Sep. 3, 2018 which is now U.S. Pat. No. 10,902,709, which itself claimed priority to the continuation-in-part application Ser. No. 14/961,461 filed Dec. 7, 2015 and now U.S. Pat. No. 10,066,388 issued on Sep. 4, 2018, which itself claimed priority to application Ser. No. 14/214,817 filed on Mar. 15, 2014 and now U.S. Pat. No. 9,227,764 issued on Jan. 5, 2016, which itself claimed priority to provisional application 61/786,597 filed on Mar. 15, 2013, the contents of which all applications are fully incorporated herein with these references.

DESCRIPTION

Field of the Invention

The present invention generally relates to a pilf resistant packaging system, utilizing a compartment that is either above or below the surrounding environment such that a pressure sensor can detect when the package has been opened.

Background of the Invention

The present invention concerns pilf resistant packaging and systems thereof. Theft of various products from within a store is a huge problem. A thief will literally cut a product out of the clear plastic packaging and steal the product after discarding the packaging. For instance, some department stores claim they have four knives stolen for every one knife that they actually sell. In the prior art, many have attempted to reduce the theft of such goods. The prior art has focuses at making cutting through the clear packaging more difficult such that it is a deterrent to a potential thief. However, adding a deterrent also makes the packaging harder to open for a legitimate customer. Also, various deterrents can appear ugly and deter a customer from purchasing the product. Accordingly, the present invention overcomes these problems and provides other benefits and advantages.

SUMMARY OF THE INVENTION

An exemplary embodiment of the present invention is a theft-proof packaging system, comprising: a product package including a compartment configured to encapsulate a product, wherein the compartment is in a non-surrounding environmental state, the non-surrounding environmental state being either pneumatically pressurized above a surrounding environment or pneumatically vacuumized below the surrounding environment; a pressure sensor assembly, comprising: a pressure sensor located at least partially inside the compartment; a power source; and a transmitter electrically connectable to the power source by the pressure sensor, wherein the transmitter is configured to send a signal; wherein the pressure sensor comprises a switch, the switch configured to disconnect and connect the power source to the transmitter, wherein the switch is configured to disconnect the power source from the transmitter in the presence of the non-surrounding environmental state inside the compartment and the switch is configured to connect the power source to the transmitter when the compartment equalizes to the surrounding environment; a receiving unit located outside the compartment of the product package and disposed remote from the product package, the receiving unit comprising: a receiver configured to receive the signal from the transmitter; and an alarm electrically connected to the receiver; wherein the pressure sensor assembly is configured to detect a change inside the compartment from the non-surrounding environmental state to the surrounding environment and then send the signal to the receiving unit activating the alarm.

In other exemplary embodiments, a passive RFID tag may be located within the compartment, the passive RFID tag configured to be detected when it passes through a walk-through scanner and activating a second alarm associated with the walk-through scanner.

In other exemplary embodiments the compartment may be a clear plastic compartment showing the product encapsulated therein.

In other exemplary embodiments the power source may be a battery.

In other exemplary embodiments the alarm may comprise a light and/or a speaker configured to produce an audible sound.

In other exemplary embodiments the alarm may send an alarm signal to an operator, the alarm signal comprising a text message, an email, a phone message, and/or a paging message.

In other exemplary embodiments an air pressure valve may be disposed within a surface of the compartment.

In other exemplary embodiments the switch may comprise a pressure sensing bias, the bias configured to be overcome by the surrounding environment in the compartment and configured to not be overcome by the non-surrounding environmental state in the compartment.

In other exemplary embodiments a portion of the switch may be in fluid communication with the inside of the compartment and an opposite portion of the switch is in fluid communication with the surrounding environment.

In other exemplary embodiments, when the non-surrounding environmental state in the compartment is pneumatically vacuumized below the surrounding environment, the vacuumized pressure inside the product packaging at sea level may be below 10, 5, 2 or 1 psi.

In other exemplary embodiments the signal may be a wireless signal.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

FIGS. 1-10 generally concern a theft-proof packaging system which includes a product package having a compartment configured to encapsulate a product, wherein the compartment is pneumatically pressurized above a surrounding environment. A pressure sensor assembly is located within the compartment. The pressure sensor assembly includes a pressure sensor, a power source electrically connected to the pressure sensor and a transmitter electrically connected to the power source. The transmitter is configured to send a signal. A receiving unit is located outside the compartment of the product package and disposed remote from the product package. The receiving unit includes a receiver configured to receive the signal from the transmitter and an alarm electrically connected to the receiver. The pressure sensor assembly is configured to detect a change in pressure inside the compartment and then send the signal to the receiving unit activating the alarm.

The alarm may comprise a light or a speaker configured to produce an audible sound. The alarm may also send an alarm signal to an operator, where the alarm signal comprises a text message, an email, a phone message, a paging message.

An air pressure valve may be disposed within a surface of the compartment. The pressure sensor may comprise a pressure sensing bias, where the bias is configured to be overcome by the pneumatic pressure in the compartment and configured to not be overcome by a pressure of the surrounding environment.

A portion of the pressure sensor assembly may be in fluid communication with the inside of the compartment and an opposite portion of the pressure sensor assembly may be in fluid communication with the surrounding environment.

The pressure sensor may comprise a switch, where the switch is open in the presence of the pneumatic pressure inside the compartment and where the switch is closed when the pneumatic pressure inside the compartment is released.

Figure 1:
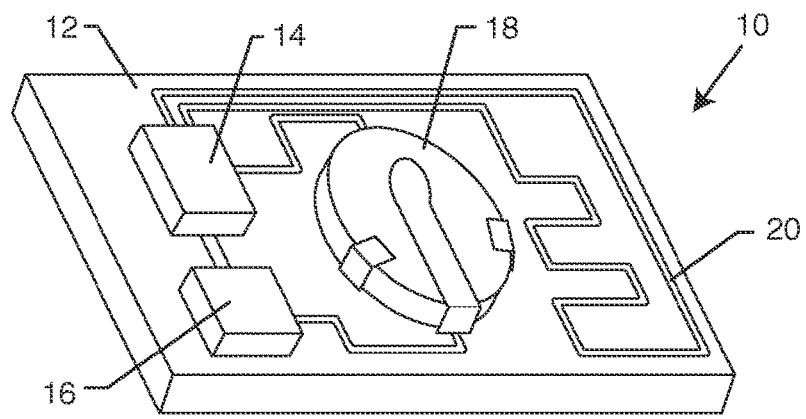
FIG. 1 is a perspective view of an exemplary pressure sensor assembly of the present invention.

FIG. 1 is a perspective view of an exemplary embodiment of the present invention. FIG. 1 shows a pressure sensor assembly 10. The pressure sensor assembly 10 is preferably small in size such that it can be placed within a packaging of a product. Many types of pressure sensor assemblies 10 may be used by one skilled in the art. A pressure sensor assembly 10 usually has a base substrate or circuit board 12. On the base substrate/circuit board 12 is mounted a power source 18, which can be a battery 18 or an externally powered passive RFID tag/receiver 18. As shown herein it is a battery 18. A battery 18 is preferred as it can transmit an extended distance as compared to a passive RFID tag and it also doesn't require a constant external signal to derive its power.

The battery 18 is connected to a microprocessor 16. The microprocessor 16 is able to perform various tasks that it is programmed to do. However, a microprocessor 16 is not even necessary in the present invention. A simple electrical circuit can be constructed that does not require the use of any electronic logic or programming, as will be later disclosed.

The battery 18 is also connected to a pressure sensor 14. Many types of pressure sensors 14 may be utilized for the present invention.

Also disposed or connected to the circuit board 12 is a transmitter/antenna 20. The transmitter 20 is configured to send a signal 44. The signal 44 may be many types of signals, such as a radio frequency signal or an infrared signal. The pressure sensor assembly 10 is constructed and configured to send the signal 44 upon detecting a pressure differential.

Figure 2:
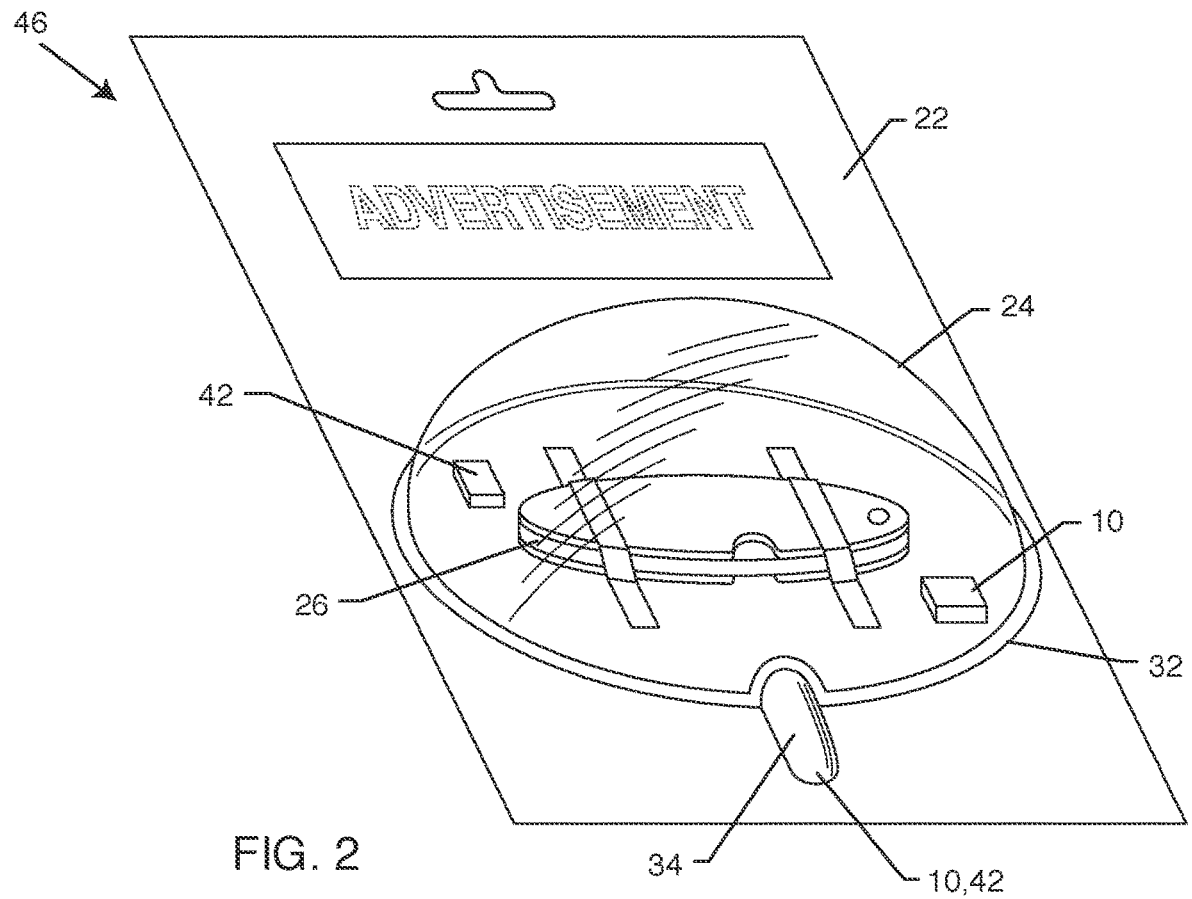
FIG. 2 is a perspective view of an exemplary product package containing the pressure sensor assembly of FIG. 1.

FIG. 2 is a perspective view of a package 46 containing a product 26. The product 26 shown herein is a knife. However, any type of product 26 can be housed within the packaging 46. The package 46 has a packaging base 22 and a packaging top 24. The packaging top 24 is shown herein as a clear bubble 24. In this way a consumer can visually see the product 26 enclosed within. It is a key aspect of the invention that the package top 24 and package bottom 22 are sealed together by a bond or seal 32 such that the enclosed volume can be pneumatically pressurized.

The pressure sensor assembly 10 is shown inside the bubble 24. The pressure sensor assembly 10 is configured to monitor the pressure inside the package 46. If a thief attempts to open the package the pressure inside the bubble 24 is released which is then detected by the pressure sensor assembly 10. The pressure sensor assembly 10 can then send a signal 44 to alert various devices.

Also shown in FIG. 2 is an RFID tag 42 attached to the package 46. The RFID tag 42 does not have to be inside the pressurized dome 24 and can be non-removably attached anywhere to the package 46. The RFID tag 42 is typically a passive RFID tag/device that can be detected when it passes through a detector. It is very typical for stores to have two scanners placed at the entrance of the store to scan for RFID tags that pass there between. This prevents a thief from attempting the steal the whole package 46. It is due to the knowledge of the RFID tag 42 that thieves will open the package 46, remove the product 26 and then discard the packaging 46.

FIG. 2 also shows a bump 34. This bump 34 is a portion of the package that may be constructed to hide either the pressure sensor assembly 10 or the RFID tag 42 from view. In this way a thief would not even know the package 46 contained any theft deterrent devices. If the pressure sensor device 10 is located within a bump 34, it must be in fluid communication with the chamber enclosing the product 26. As can be devised by one skilled in the art, various sizes and shapes of the bump 34 may be created that are aesthetically pleasing while also being functional. The present invention is not limited to the precise form disclosed and shown herein but is merely a representation of one embodiment.

Figure 3:
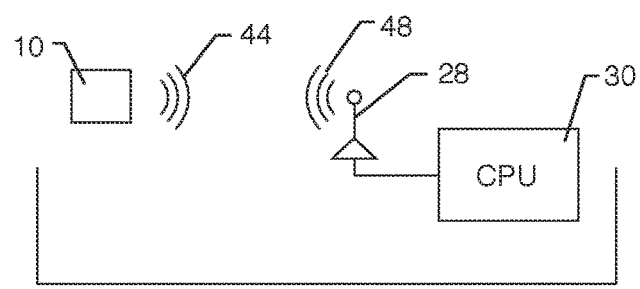
FIG. 3 is a schematic representation of the present invention in action.

FIG. 3 is a simple schematic of the present in operation. If the pressure inside the package 46 is released, the pressure sensor assembly 10 is configured to send a signal 44. The signal 44 is received by an external receiver 28. The receiver is then electrically connected to an alert device 30.

The alert device 30 can be a multitude of devices such as visual lights, audible alarm sounds, computers, cell phones, smart phones, laptop computers, specialized security systems and devices or combinations thereof. The alert device 30 can even be programmed to send a second signal 48 to alert various other devices or personnel. The second signal 48 can be a text message, an email, a pager signal, a tweet, a phone call or a phone message. The second signal 48 can be received by a buildings security system and direct security personnel to the area where the theft is occurring.

It would also be advantageous if the alert device 30 was configured to direct other electronic surveillance means to the location of the pressure sensor device 10. For instance, when a pressure sensor device 10 sends a signal 44, the location of the signal 44 can be tracked. Video of the area or location of the pressure sensor assembly 10 can be recorded and tracked. For example, two or three receivers 28 and two or three alert devices 30 can be used to accurately locate the location of the pressure sensor assembly 10.

A significant advantage of the present invention is that the exact moment a thief attempts to open a package 46 the pressure sensor assembly 10 will detect the pilfering. Yet, a customer can purchase the product and then open the package 46 outside the store. The package 46 does not have to include extra thick plastic or other theft deterrent means that is also difficult for the customer to open.

Figure 4:
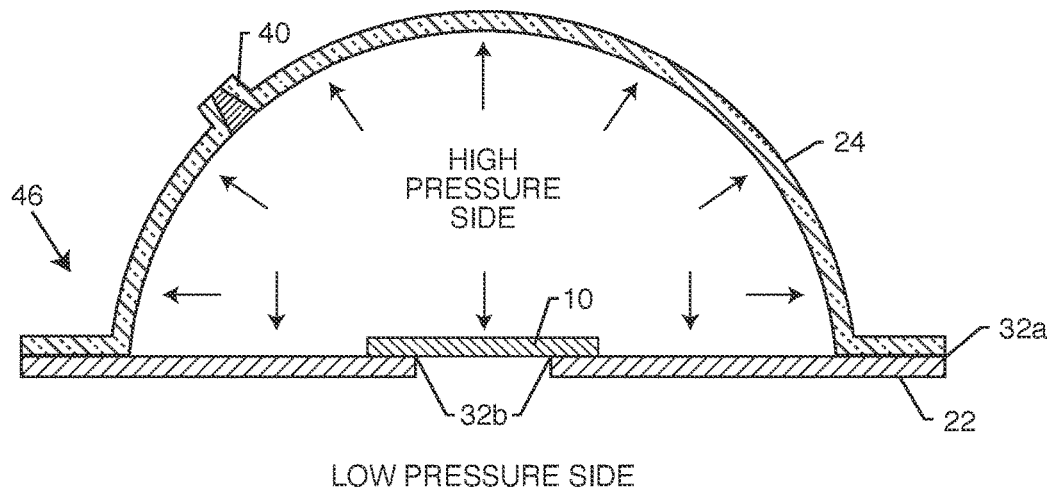
FIG. 4 is a sectional view of a pressure sensor assembly integrated with a product packaging.

FIG. 4 is a sectional view of one embodiment of the present invention. The inside of the dome 24 contains a high pressure side. A low pressure side is outside the package 46. The low pressure side is atmospheric pressure. Here, the pressure sensor assembly 10 is connected to a wall of the package base 22. The pressure sensor assembly 10 is sealed 32b to the base 22. This means that the pressure sensor assembly itself has a low pressure side and a high pressure side which is used to detect a pressure change. The seal 32a seals the top 24 to the base 22.

A valve 40 is also shown. The valve 40 is just one embodiment of how a high pressure is created inside the package 46. The valve 40 can be used to pressurize the inside of the package 46. Alternatively, the inside of the package 46 can be pressurized during manufacture of the package 46 when the product 26 is enclosed therein.

Figure 5:
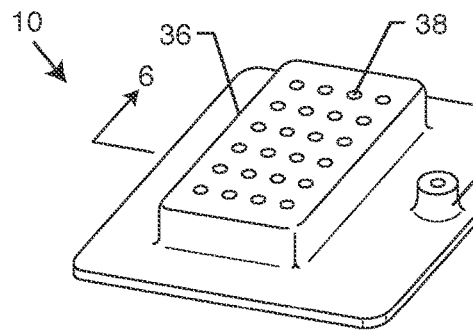
FIG. 5 is a perspective view of an exemplary pressure sensor assembly of the present invention.
Figure 6:
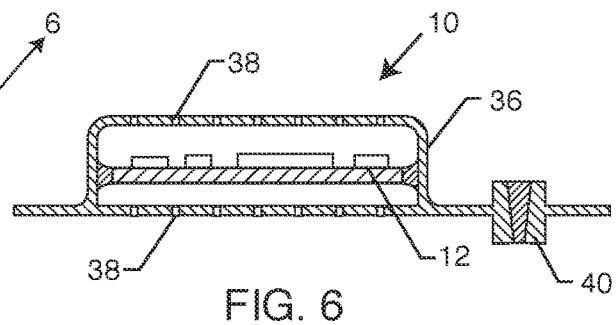
FIG. 6 is a sectional view taken of the structure of FIG. 5 along lines 6-6.

FIGS. 5 and 6 are just one example of an exemplary pressure sensor assembly 10. Shown herein, the pressure sensor assembly 10 has a housing 36. The housing 36 may then be sealed to the base 22 or top 24. The housing 36 has at least one hole/aperture 38 on each side. Air pressure is able to then flow to each side of the circuit board 12. The housing prevents a thief from tampering with the pressure sensor assembly 10 itself. The valve 40 may be integrated into the housing 36.

Figure 7:
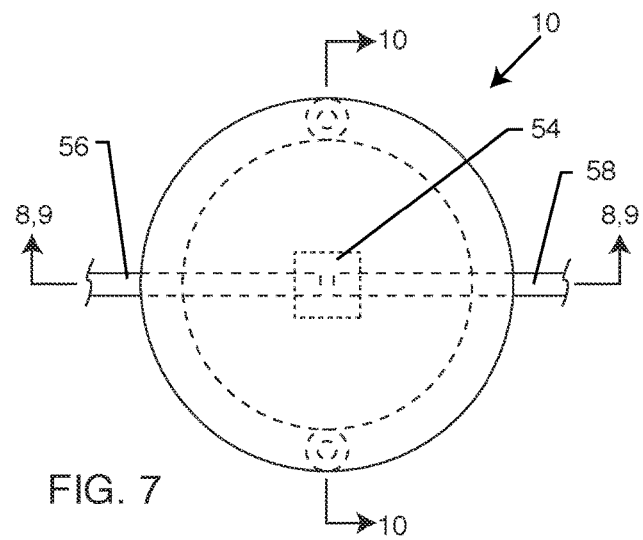
FIG. 7 is a top view of an exemplary pressure activated switch of the present invention.
Figure 8:
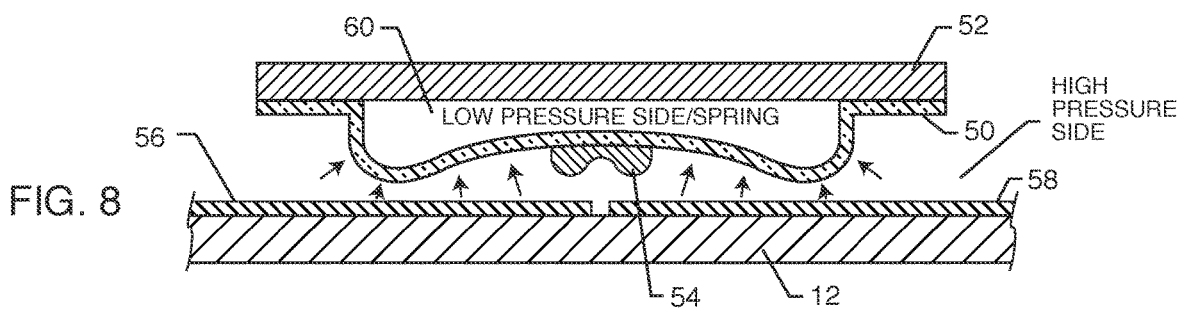
FIG. 8 is a sectional view taken of the structure of FIG. 7 along lines 8-8 wherein a high pressure is present.
Figure 9:
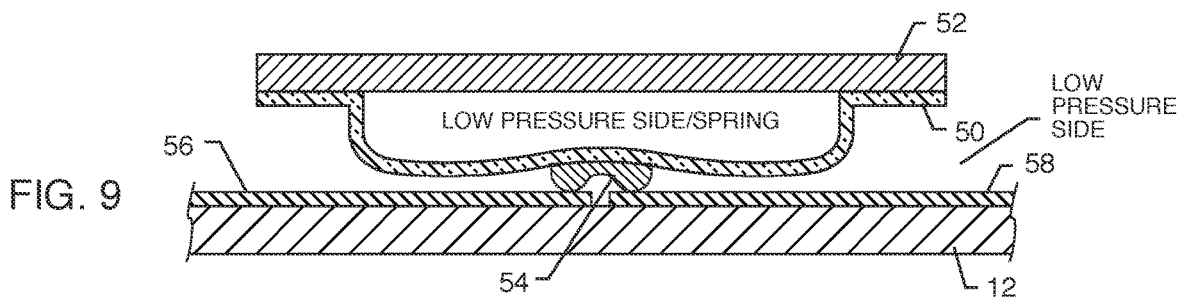
FIG. 9 is a sectional view taken of the structure of FIG. 7 along lines 9-9 wherein the high pressure is released.
Figure 10:
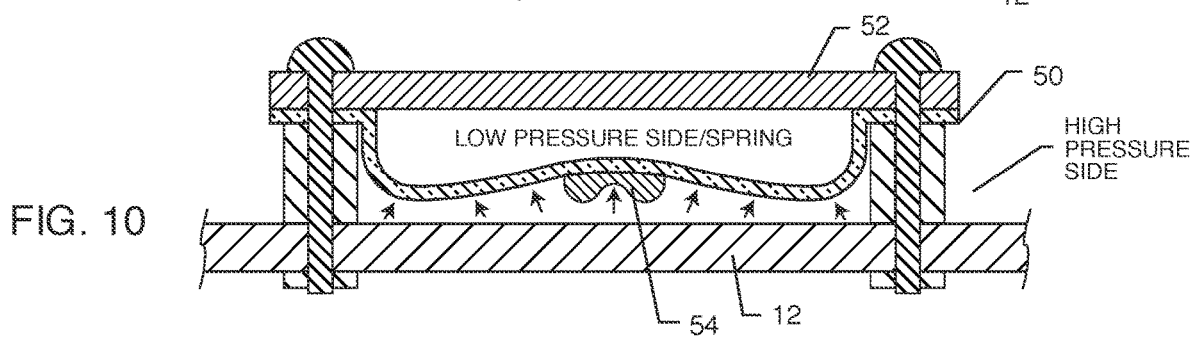
FIG. 10 is a sectional view taken of the structure of FIG. 7 along lines 10-10 wherein the high pressure is present.

It is preferred that the pressure sensor assembly 10 be fully enclosed in the pressurized enclosure of the package 46. FIGS. 7-10 show just one simple embodiment that creates a pressure sensor assembly 10. FIG. 7 is a top view of a simplistic pressure sensor assembly 10. FIGS. 8-10 are sectional views through the structure of FIG. 7. In FIGS. 8 and 10, the pressure sensor assembly 10 is disposed within a high pressure side of a package 46. High air pressure is acted upon a flexible membrane 50 that is sealed against a top substrate 52. A conductive switch 54 is placed onto the flexible membrane 50. When the pressure sensor assembly 10 is inside the high pressure side, a force is exerted against the flexible membrane 50. This then moves the conductive switch 54 away from a first conductive path 56 and a second conductive path 58. The low pressure side 60 of the membrane 50 may also be a spring/bias element (not shown) located therein. The spring/bias element is configured with the appropriate force to be actuated by a release of the pressure.

When the package 46 is opened, the membrane 50 moves downward as shown herein in FIG. 9. The conductive switch 54 then contacts the first and second conductive paths 56 and 58 which then completes an electrical circuit to send the signal 44. The exemplary embodiments disclosed herein is merely representative of just one example of a pressure sensor assembly 10. It is understood that those skilled in the art after understanding this disclosure could use other structures and geometries to accomplish similar goals and objectives. Therefore, the invention is not limited to the precise forms disclosed herein. The provisional application 61/786,597 also showed a similar embodiment of a pilf resistant packaging system embodying the present invention. The contents of the provisional application are incorporated in full herein with this reference.

All of the teachings previously described generally apply to pneumatically pressurizing the product package above the surrounding environment. However, all of these teachings are equally applicable to the present invention if the product package has a lower pressurization in comparison to the surrounding environment. In this case a vacuum could be pulled inside the product packaging such that the product package includes a compartment configured to encapsulate a product, wherein the compartment is pneumatically vacuumized below a surrounding environment. The pressure sensor is still configured to sense a change in pressure, whether that pressure change is decreasing or increasing. Therefore, the detailed description herein is equally applicable to both the pressurized and vacuumized embodiments.

Note, vacuumized means to pull a vacuum such that the pressure in the product package is below the surrounding environment. In other words, vacuumized is the opposite of pressurized.

Typically, atmospheric pressure is generally 14.7 pounds per square inch at sea level ignoring temperature and humidity variances. Atmospheric pressure rises if one was to travel below sea level in certain places in the world. Likewise, as the altitude rises, atmospheric pressure drops. For example, at 10,000 feet above sea level the atmospheric pressure is generally around 10.1 pounds per square inch (lbs/in2 or psi). The present invention should generally be able to be used at locations of higher altitude (for example in Denver—12 psia), so designing the vacuum to be well below 14.7 lbs/in2 is desired. For example, the vacuumized pressure inside the product package can be below 12 psi, 11 psi, 10 psi, 9 psi, 8 psi, 7 psi, 6 psi and 5 psi.

It is also taught herein that commercial/shipping airlines can travel at altitudes of 30,000 to 40,000 feet, where the atmospheric pressure (psia) is respectively 4.36 psia and 2.7 psia. Therefore, the vacuumized pressure inside the product package could be equal to or less than 5 psi, 4 psi, 3 psi, 2 psi and 1 psi. A vacuumized pressure below 2-1 psi should be enough to enable the present invention to work in all environments and conditions even if the shipping airlines did not have pressurized compartments. As taught herein, it is not required to pull a perfect vacuum as achieving a perfect vacuum is hard to achieve and maintain. In other words, it can be very expensive to achieve a near pure vacuum which can make a pure vacuum practically impossible. Therefore, having a pressure below, for example, 10-2 psi is enough to fully enable the present invention.

Although several embodiments have been described in detail for purposes of illustration, various modifications may be made to each without departing from the scope and spirit of the invention. Accordingly, the invention is not to be limited, except as by the appended claims.

What is claimed is:

1. A theft-proof packaging system, comprising:
   a product package including a compartment configured to encapsulate a product, wherein the compartment is in a non-surrounding environmental state, the non-surrounding environmental state being either pneumatically pressurized above a surrounding environment or pneumatically vacuumized below the surrounding environment;
a pressure sensor assembly, comprising:
a pressure sensor located at least partially inside the compartment;
a power source; and
a transmitter electrically connectable to the power source by the pressure sensor, wherein the transmitter is configured to send a signal;
wherein the pressure sensor comprises a switch, the switch configured to disconnect and connect the power source to the transmitter, wherein the switch is configured to disconnect the power source from the transmitter in the presence of the non-surrounding environmental state inside the compartment and the switch is configured to connect the power source to the transmitter when the compartment equalizes to the surrounding environment;
a receiving unit located outside the compartment of the product package and disposed remote from the product package, the receiving unit comprising:
a receiver configured to receive the signal from the transmitter; and
an alarm electrically connected to the receiver;
wherein the pressure sensor assembly is configured to detect a change inside the compartment from the non-surrounding environmental state to the surrounding environment and then send the signal to the receiving unit activating the alarm.

2. The theft-proof packaging system of claim 1, including a passive RFID tag located within the compartment, the passive RFID tag configured to be detected when it passes through a walk-through scanner and activating a second alarm associated with the walk-through scanner.

3. The theft-proof packaging system of claim 1, wherein the compartment is a clear plastic compartment showing the product encapsulated therein.

4. The theft-proof packaging system of claim 1, wherein the power source is a battery.

5. The theft-proof packaging system of claim 1, wherein the alarm comprises a light and/or a speaker configured to produce an audible sound.

6. The theft-proof packaging system of claim 1, wherein the alarm sends an alarm signal to an operator, the alarm signal comprising a text message, an email, a phone message, and/or a paging message.

7. The theft-proof packaging system of claim 1, including an air pressure valve disposed within a surface of the compartment.

8. The theft-proof packaging system of claim 1, wherein the switch comprises a pressure sensing bias, the bias configured to be overcome by the surrounding environment in the compartment and configured to not be overcome by the non-surrounding environmental state in the compartment.

9. The theft-proof packaging system of claim 1, wherein a portion of the switch is in fluid communication with the inside of the compartment and an opposite portion of the switch is in fluid communication with the surrounding environment.

10. The theft-proof packaging system of claim 1, wherein, when the non-surrounding environmental state in the compartment is pneumatically vacuumized below the surrounding environment, the vacuumized pressure inside the product packaging at sea level is below 10 psi.

11. The theft-proof packaging system of claim 1, wherein, when the non-surrounding environmental state in the compartment is pneumatically vacuumized below the surrounding environment, the vacuumized pressure inside the product packaging at sea level is below 5 psi.

12. The theft-proof packaging system of claim 1, wherein, when the non-surrounding environmental state in the compartment is pneumatically vacuumized below the surrounding environment, the vacuumized pressure inside the product packaging at sea level is below 2 psi.

13. The theft-proof packaging system of claim 1, wherein, when the non-surrounding environmental state in the compartment is pneumatically vacuumized below the surrounding environment, the vacuumized pressure inside the product packaging at sea level is below 1 psi.

14. The theft-proof packaging system of claim 1, wherein the signal is a wireless signal.

15. A theft-proof packaging system, comprising:
a product package including a compartment configured to encapsulate a product, wherein the compartment is in a non-surrounding environmental state, the non-surrounding environmental state being either pneumatically pressurized above a surrounding environment or pneumatically vacuumized below the surrounding environment;
a pressure sensor assembly, comprising:
a pressure sensor located at least partially inside the compartment;
a power source, wherein the power source is a battery; and
a transmitter electrically connectable to the power source by the pressure sensor, wherein the transmitter is configured to send a wireless signal;
wherein the pressure sensor comprises a switch, the switch configured to disconnect and connect the power source to the transmitter, wherein the switch is configured to disconnect the power source from the transmitter in the presence of the non-surrounding environmental state inside the compartment and the switch is configured to connect the power source to the transmitter when the compartment equalizes to the surrounding environment;
a receiving unit located outside the compartment of the product package and disposed remote from the product package, the receiving unit comprising:
a receiver configured to receive the wireless signal from the transmitter; and
an alarm electrically connected to the receiver;
wherein the pressure sensor assembly is configured to detect a change inside the compartment from the non-surrounding environmental state to the surrounding environment and then send the wireless signal to the receiving unit activating the alarm; and
a passive RFID tag located within the compartment, the passive RFID tag configured to be detected when it passes through a walk-through scanner and activating a second alarm associated with the walk-through scanner.

16. A theft-proof packaging system, comprising:
a product package including a compartment configured to encapsulate a product, wherein the compartment is in a non-surrounding environmental state, the non-surrounding environmental state being either pneumatically pressurized above a surrounding environment or pneumatically vacuumized below the surrounding environment, and wherein the compartment is a clear plastic compartment showing the product encapsulated therein;

a pressure sensor assembly, comprising:
   a pressure sensor located at least partially inside the compartment;
   a power source, wherein the power source is a battery; and
   a transmitter electrically connectable to the power source by the pressure sensor, wherein the transmitter is configured to send a wireless signal;
   wherein the pressure sensor comprises a switch, the switch configured to disconnect and connect the power source to the transmitter, wherein the switch is configured to disconnect the power source from the transmitter in the presence of the non-surrounding environmental state inside the compartment and the switch is configured to connect the power source to the transmitter when the compartment equalizes to the surrounding environment;
a receiving unit located outside the compartment of the product package and disposed remote from the product package, the receiving unit comprising:
   a receiver configured to receive the wireless signal from the transmitter; and
   an alarm electrically connected to the receiver;
wherein the pressure sensor assembly is configured to detect a change inside the compartment from the non-surrounding environmental state to the surrounding environment and then send the wireless signal to the receiving unit activating the alarm; and
a passive RFID tag located within the compartment, the passive RFID tag configured to be detected when it passes through a walk-through scanner and activating a second alarm associated with the walk-through scanner.

* * * * *